United States Patent

[11] 3,612,991

[72] Inventor Malbone W. Greene
Covina, Calif.
[21] Appl. No. 869,237
[22] Filed Oct. 24, 1969
[45] Patented Oct. 12, 1971
[73] Assignee Beckman Instruments, Inc.

[54] PARAMAGNETIC GAS SENSOR HAVING CAPACITIVE POSITION SENSING AND AC NULL BALANCING FEEDBACK
13 Claims, 6 Drawing Figs.

[52] U.S. Cl. ............................................. 324/36, 324/99
[51] Int. Cl. .................................................. G01r 33/12, G01r 17/06
[50] Field of Search ........................................... 324/36; 73/23, 27.5

[56] References Cited
UNITED STATES PATENTS
2,985,826 5/1961 Fluegel .................... 324/61 B
3,302,448 2/1967 Mocker .................... 324/36 UX
3,487,297 12/1969 Guyton ..................... 324/36

Primary Examiner—Alfred E. Smith
Attorneys—Thomas L. Peterson and Robert J. Steinmeyer ABSTRACT: Apparatus for determining the partial pressure of a paramagnetic gas in a gas mixture wherein a pivotally mounted test body is supported in an inhomogeneous magnetic field, the test body being deflected from a null position when the paramagnetic gas is present, the improvement wherein an AC bridge circuit is utilized, in response to deflection of the test body from the null position, to generate an AC signal indicative of the partial pressure of the paramagnetic gas. The bridge circuit comprises a pair of electrostatic vanes which, in conjunction with the test body, form capacitive elements of the bridge circuit. The AC signal is either measured to determine the test body position, or demodulated to provide a DC signal. The DC signal may be fed back to the bridge circuit to return the test body to the null position for improved linearity and stability. Apparatus is further provided to vary the fraction of the DC signal fed back to the bridge circuit with changes in temperature of the test body to compensate the apparatus for temperature variations.

INVENTOR.
MALBONE W. GREENE

INVENTOR.
MALBONE W. GREENE
BY
Thomas L. Peterson
ATTORNEY

PARAMAGNETIC GAS SENSOR HAVING CAPACITIVE POSITION SENSING AND AC NULL BALANCING FEEDBACK

BACKGROUND OF THE INVENTION

1. Field of the Invention

The present invention relates generally to an instrument for measuring the quantity of a particular gas present in a gas mixture and, more particularly, to a paramagnetic oxygen sensor which utilize AC position sensing which may also be combined with electrostatic DC null balancing and temperature compensation to provide a highly stable and linear electrical output indicative of the partial pressure of oxygen in a mixture of gases.

2. Description of the Prior Art

Apparatus for measuring the partial pressure of a paramagnetic gas, such as oxygen, in a mixture of gases is old and well known. One type of apparatus, and the type to which the present invention relates, is disclosed in U.S. Pat. No. 2,416,344 issued on Feb. 25, 1947 to Linus Pauling. Such apparatus is based on the principal that the force acting on a test body in an inhomogeneous magnetic field is dependent on the magnetic susceptibility of the gas surrounding the test body. Since oxygen alone of the common environmental gases is highly paramagnetic while all other components are very slightly diamagnetic, a measurement of the force generated by a mixture of gases provides a measurement of the partial pressure of oxygen in the gas mixture with very little error or need for correction because of the presence of the other gases.

Apparatus of the type described in U.S. Pat. No. 2,416,344 utilizes a test body in the form of two hollow spheres in a dumbbell configuration freely suspended on a quartz fiber. The test body is then placed in an inhomogeneous magnetic field (established, for example, by wedge-shaped pole pieces) and the force exerted on the text body is measured.

Since a magnetic field is a conservative system, the equation describing the magnetic force exerted upon a body in an inhomogeneous magnetic field may be derived from energy considerations. In any such conservative system, the force exerted on a body is given by the negative of the partial derivative of the potential energy with respect to the direction of the force. Thus, the magnetic force exerted on the body is, $$F_m = H \frac{\partial H}{\partial \Theta}(X_b - X_m)V_b \quad (1)$$

where: $H$ = the magnetizing force;
$V_b$ = the volume of the test body;
$X_b$ = the magnetic susceptibility per unit volume of the test body;
$X_m$ = the magnetic susceptibility per unit volume of the medium surrounding the test body per unit pressure; and
$\Theta$ = the angular coordinate of the test body.

In a simple instrument, the magnetic torque, which is the product of the force given by equation (1) and the radial distance, R, between the centroid of the test body and the axis of rotation, is balanced by the suspension fiber torque, making the angle of rotation of the test body a direct function of the volume magnetic susceptibility of the medium surrounding the test body.

In the apparatus described in U.S. Pat. No. 2,416,344, the quartz fiber carries a mirror such that the displacement of the fiber-supported test body from its equilibrium position, corresponding to changes in the composition of the medium surrounding the test body, may be measured by a scale which is positioned in the path of a light spot reflected from the mirror. While such light means is superior to many mechanically connected systems for measuring the displacement of the test body from its equilibrium position, it still has a major disadvantage of not providing an electrical output which may be further processed or transmitted to a remote location.

To overcome this disadvantage, it has been suggested to use photosensitive devices for receiving the reflected light spot, which photosensitive devices are capable of providing an electrical output signal. However, such photosensitive systems have other problems associated therewith. As pointed out in U.S. Pat. No. 3,290,921 issued Dec. 13, 1966 to M. W. Greene et al., the power inputs to the required incandescent lamps are substantial, the lamp filaments must operate at high temperatures and be replaced at frequent intervals, and focusing the beams, the presence of dust on the optical elements, and amplifier drift create additional problems.

An additional problem associated with such simple instruments is that the force function $$H \frac{\partial H}{\partial \Theta}$$

is nonlinear for large angles of rotation, due to the fact that $$H \frac{\partial H}{\partial \Theta}$$

is a function of $\theta$. To solve this problem, the magnetic torque may be balanced by an electrostatic torque to provide an electrical output. A significant benefit of this approach lies in maintaining $$H \frac{\partial H}{\partial \Theta}$$

constant by null balancing to retain essentially constant $\theta$. Theoretically, therefore, the null balanced system may provide a very linear output, if electrostatic torque can be made a linear function of output voltage.

A system utilizing electrostatic null balancing is described in U.S. Pat. No. 3,026,472 issued Mar. 20, 1962 to M. W. Greene et al. In that patent, the electrostatic field is provided by positioning one or more electrodes or vanes adjacent the test body and connecting appropriate electrical potentials to the electrodes. An electrical potential is also connected to the test body and the electrostatic force acting on the test body is controlled by suitably varying the potentials of the vanes and/or test body. In such a system, the electrostatic torque which is applied to the vanes and/or test body is proportional to the difference between the voltages applied to the electrostatic vanes, the rate of changes of capacitance with angular rotation, and the test body voltage. In addition, the change in electrostatic torque is a linear function of the voltage change applied to the vanes and/or test body. As a result, the applied voltage change is a direct indication of the change in composition of the mixture surrounding the test body.

While the combination of electrostatic null balancing with optical sensing of the test body position yields superior results, the system still does not have high inherent stability and reliability for many applications.

In order to provide a system having maximum inherent stability, sensitivity and reliability, it has been suggested to provide a system which utilizes and measures variations of capacitance of the test body to its surroundings due to its rotation. The suggested system used two tuned circuits, with the capacitance from each vane to the test body being utilized to tune one of the two circuits. Variations in tank circuit voltage as the varying capacitance approached or receded from resonance at the fixed driving frequency were used to indicate the position of the test body. Unfortunately, however, this approach has several inherent disadvantages due to the fact that the sum of the torques due to the voltages between the vanes and the test body must be carefully balanced and these voltages are influenced by stray capacitance. The tuning is accomplished by the stray capacitance as well as by the vane-to-test body capacitance. Consequently, the stray capacitances must be balanced and maintained constant and must not be large compared to the vane-to-body capacitance if good sensitivity is to be realized. As a result, to avoid instability of electrostatic forces, it becomes necessary to tune one circuit so that it approaches resonance as the test body moves away from the corresponding vane and to tune the other so that it recedes from resonance as the test body moves toward the corresponding vane. When operating in this mode, the shifts in tank voltage amplitude tend to oppose the magnetic force, but the net deflection then also depends upon the Q of each circuit as well as upon the drive coil voltage. In addition, the intervane capacitance couples the two tank circuits together and prevents sharp tuning of one circuit without upsetting the other.

Aside from the problems of stability and reliability, an additional problem arises from the fact that the magnetic susceptibility per molecule of a paramagnetic gas is inversely proportional to the absolute temperature of the gas. The magnetic susceptibility per molecule of a diamagnetic gas is independent of temperature. Since the test body susceptibility is determined primarily by the fixed mass of oxygen contained within it, and the diamagnetic components have no temperature coefficient, the test body susceptibility is inversely proportional to the absolute temperature. Since equation (1) involves the volume magnetic susceptibility, thermal expansion of the sample gas with increasing temperature results in an additional temperature factor for the unconfined sample gas. Consequently, the volume magnetic susceptibility of the sample gas is inversely proportional to the square of the absolute temperature.

Referring to equation (1), the magnetic susceptibilities $X_b$ and $X_m$ may be replaced by $Y_b/T$ and $Y_m/T^2$, respectively to reflect the dependence upon absolute temperature of the magnetic susceptibilities per unit volume of the test body and the medium surrounding the test body. Equation (1) may be rewritten as:

$$F_m = H \frac{\partial H}{\partial \Theta} \left( \frac{Y_b}{T} - \frac{Y_m}{T^2} \right). \quad (2)$$

By taking the derivative of equation (2), neglecting the minor change in $H$ with $T$, the rate of change of magnetic force with temperature is obtained:

$$\frac{dF_m}{dT} = H \frac{\partial H}{\partial \Theta} (2X_m - X_b) \frac{1}{T} \quad (3)$$

From equation (3), it is seen that there will be not thermal coefficient where the magnetic susceptibility of the medium surrounding the test body is equal to one-half of the equivalent susceptibility of the test body. Therefore, by making the test body susceptibility equal to the full scale susceptibility of the sample medium, the thermal error at mid scale may be reduced to approximately zero. However, at other values of medium susceptibility, there are significant errors due to relative temperature changes. For this reason, most accurate paramagnetic oxygen sensors have included some form of apparatus to prevent changes in system temperature. In addition, since the thermal error is linearly proportional to the degree of temperature change, high precision systems have invariably required expensive temperature control apparatus.

SUMMARY OF THE INVENTION

According to the present invention there is provided a paramagnetic oxygen sensor which substantially overcomes these problems of the prior art. The present paramagnetic oxygen sensor utilizes apparatus of the type disclosed in U.S. Pat. No. 2,416,344 to derive a measurement of the magnetic susceptibility of a mixture of gases. However, the present sensor completely eliminates the requirement for a spot of light being reflected from a mirror secured to the suspension fiber and substitutes a device which provides an electrical output which may be further processed and/or transmitted to a remote location. According to a preferred embodiment of the present invention, the problem caused by the nonlinearity of the force function $$H \frac{\partial H}{\partial \Theta}$$

for large angles of rotation is eliminated by the use of electrostatic null balancing to retain essentially constant $\theta$. In addition to provide a system having maximum inherent stability and reliability, AC position sensing is utilized, but in a manner such that the problems associated with tuned circuits are not present. Finally, for improved performance, a technique for thermal compensation, rather than thermal control, is introduced, Such feature provides a less expensive and more flexible means of accomplishing the end normally achieved in existing instruments by temperature control.

Briefly, the present paramagnetic oxygen sensor operates on the principal of applying AC to two electrostatic vanes positioned adjacent a test body, which vanes, in conjunction with the test body, form capacitive elements of a bridge capable of detecting the position of the test body. Such circuit can be used to provide either an AC or a DC output proportional to test body rotation. In addition, according to the present invention, improved results may be achieved by combining such AC position sensing with DC null balancing in which the magnetic torque applied to the test body with varying sample magnetic susceptibility is electrostatically null balanced. Such electrostatic null balancing is accomplished by application of a DC potential to each of the two vanes and to the test body. The test body forms the output of the capacitance bridge and assumes an AC potential that is a function of the position of the test body with respect to the two vanes. The AC signal derived from the test body is amplified and demodulated to provide a DC output signal. The demodulated output is further DC amplified and fed back to the two vanes or to the test body to provide a linear voltage output with variations in the partial pressure of oxygen in the sample gas mixture. Finally, the present invention includes a technique for temperature compensation in which a thermistor forms a part of the feedback loop between the DC amplifier and the vanes or test body. In this manner, precisions comparable to those achieved with expensive temperature control apparatus can be realized with relatively inexpensive compensation circuitry.

This overall approach has the theoretical advantage of providing essentially permanent calibration stability. More specifically, provided only that the DC voltage applied to the vanes, the magnetic field, and the geometry of the system are stable, the output should be essentially independent of the amplifier gain provided only that the gain exceeds a minimum, known, value, Therefore, such an approach has the capability of conventional closed loop servosystems which are commonly employed for achievement of extreme reliability and stability.

It is therefore an object of the present invention to provide an improved paramagnetic oxygen sensor.

It is a further object of the present invention to provide a paramagnetic oxygen sensor which completely eliminates the necessity for positioning a measuring scale in the path of a light spot reflected from a mirror.

It is a still further object of the present invention to provide a paramagnetic oxygen sensor having a highly stable and linear electrical output.

It is another object of the present invention to provide a paramagnetic oxygen sensor which utilizes AC position sensing to provide an AC or DC output.

It is still another object of the present invention to provide a paramagnetic oxygen sensor which combines AC position sensing and DC null balancing to provide a highly stable electrical output.

Another object of the present invention is the provision of a paramagnetic oxygen sensor which utilizes AC position sensing combined with electrostatic DC null balancing and temperature compensation to provide an electrical output indicative of the partial pressure of oxygen or other paramagnetic gas in a mixture of gases.

Still another object of the present invention is the provision of a paramagnetic oxygen sensor in which changes of temperature are compensated for in a less expensive and more flexible manner than previously accomplished with expensive temperature control systems.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
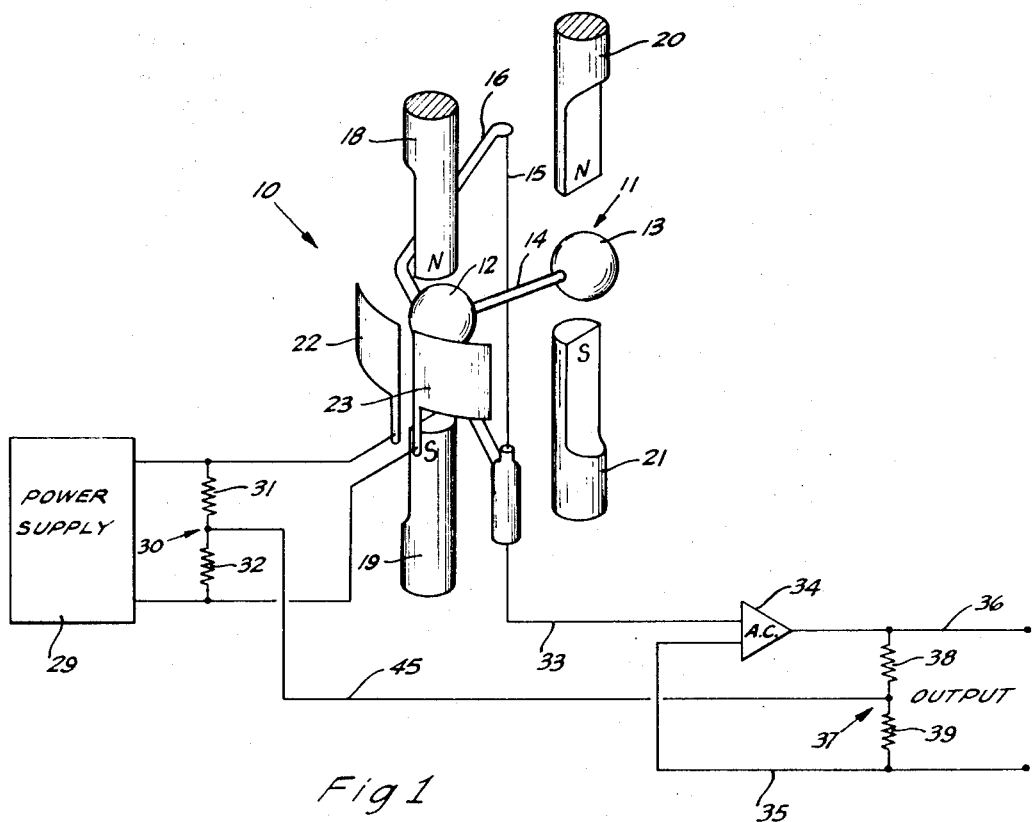
FIG. 1 is a diagrammatic representation of a first embodiment of paramagnetic oxygen sensor constructed in accordance with the teachings of the present invention.

Referring now to the drawings and, more particularly, to FIG. 1 thereof, the present paramagnetic oxygen sensor, generally designated 10, utilizes the same principal as that of the sensor described in the beforementioned U.S. Pat. No. 2,416,344. Accordingly, the construction and operation of the mechanical components of sensor 10 will not be described in detail. It is sufficient to note that paramagnetic oxygen sensor 10 includes a test body 11 in the form of two hollow spheres 12 and 13 carried at the end of a rod 14, in a dumbbell configuration, which is suspended from a quartz fiber 15 strung upon a quartz bow 16. Magnetic pole pieces 18, 19, 20 and 21 are mounted above and below spheres 12 and 13, respectively, to produce an inhomogeneous magnetic field in which spheres 12 and 13 move. In addition, a pair of electrostatic vanes 22 and 23 are geometrically positioned in close proximity to test body sphere 12, and test body 11 as well as fiber 15 and bow 16 are made electrically conductive.

According to the present invention, displacement of test body 11 from its equilibrium position, corresponding to changes in the composition of the medium surrounding test body 11, is detected using AC position sensing techniques. More specifically position sensor 10 includes a power supply 29, containing both AC and DC components, the output of which is connected to vanes 22 and 23 and across a voltage divider network 30 consisting of resistors 31 and 32. The electrical potential on test body 11 is conducted via support 16 and a line 33 to the input of an AC amplifier 34. The other input to AC amplifier 34 is connected to a common line 35. The output of amplifier 34 is applied to a line 36, the AC output of paramagnetic oxygen sensor 10 being derived between lines 35 and 36. Also connected between lines 35 and 36 is a voltage divider network 37 consisting of resistors 38 and 39. The junction between resistors 38 and 39 is connected to the junction between resistors 31 and 32 of voltage divider network 30 via a line 45.

In operation, resistors 31 and 32, and vanes 22 and 23 in conjunction with test body 11, form the four elements of a capacitance and resistance bridge. The AC component delivered from power supply 29 energizes the bridge and the output of the bridge appears between test body 11 and the junction between resistors 31 and 32. The bridge is balanced when the capacitance between vane 22 and sphere 12 is equal to the capacitance between vane 23 and sphere 12. As test body 11 rotates due to variations in magnetic torque, the relative capacitances between vanes 22 and 23 and test body 11 are altered. If, for example, sphere 12 approaches vane 22 and receivers from vane 23, the capacitance at vane 22 increases while that at vane 23 decreases. The r.m.s. value of potential between vane 22 and sphere 12, in this case, will decrease while that between vanes 23 and sphere 12 will increase. Thus, the AC bridge output potential is applied to the input of AC amplifier 34 which provides, on line 36, an AC output proportional to the displacement of test body 11 from its equilibrium position corresponding to changes in the composition of the medium surrounding the test body.

The effect of stray capacitance is to load down the input of amplifier 34. However, the feedback on line 45 multiplies the effective amplifier input impedance by the loop gain of amplifier 34. As a result, the loading effect of amplifier 34 may be made negligible by utilizing an amplifier having very high open loop gain, and utilizing a relatively small closed loop gain.

The potential drop from each of vanes 22 and 23 to test body 11 is such that the electrical torque opposes rotation, making the system stable. That is, when the capacitance between one vane and test body 11 increases and the capacitance between the other vane and test body 11 decreases, the voltages on such vanes change inversely, providing an electrostatic force tending to restore test body 11 to its original position. Thus, paramagnetic oxygen sensor 10 may be used to measure deflection directly, as in FIG. 1, or may be used for providing an AC signal that can be further amplified, demodulated and fed back for null balancing as described hereinafter.

Figure 2:
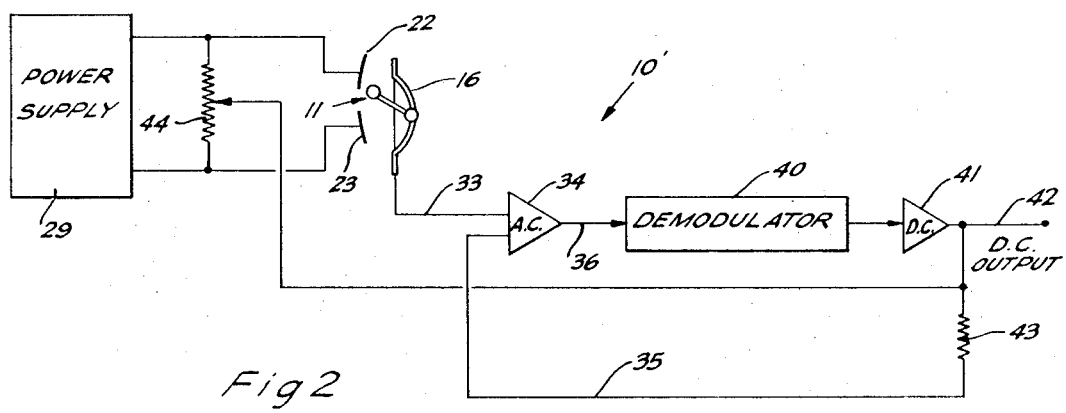
FIG. 2 is a diagrammatic representation of a second embodiment of paramagnetic oxygen sensor which is essentially similar to the embodiment of FIG. 1 but incorporates electrostatic null balancing with AC position sensing.

Referring now to FIG. 2, paramagnetic oxygen sensor 10 may be modified to form a sensor 10' which includes a power supply 29, test body 11, vanes 22 and 23 and AC amplifier 34. However, sensor 10' differs from sensor 10 in that the output of AC amplifier 34 is demodulated by a demodulator 40 to provide a DC signal which is further amplified by a DC amplifier 41 to provide, on a line 42, a DC output and a DC feedback voltage for null balancing of the system. The DC output of amplifier 41, appearing across a resistor 43, may be fed back to the slider of a potentiometer 44 which is connected across power supply 29 and which replaces voltage divider network 30.

The operation of sensor 10' is similar to the operation of sensor 10 in that the output of the bridge circuit appears between the slider of potentiometer 44 and test body 11. This AC signal is amplified by amplifier 34 and demodulated by demodulator 40 to provide a DC signal which is amplified by amplifier 41. Thus, the DC output of amplifier 41, appearing across resistor 43, is proportional to the displacement of test body 11 from its equilibrium position corresponding to changes in the composition of the gas surrounding the test body. Such a system, which combines AC position sensing and demodulation to provide a DC output proportional to the deflection of test body 11, is quite desirable since it offers the least expensive approach to the solution of the problem. In addition, the sensitivity of the system would be great enough to permit the use of much heavier fibers and much smaller deflection in order to keep $$H\frac{\partial H}{\partial \Theta}$$

essentially constant. In contrast, light beam deflection instruments require relatively large deflections to increase sensitivity.

Alternatively, the DC output of amplifier 41 may be fed back to the slider of potentiometer 44 thus shifting the DC operating level of power supply 29 by the amount appearing across resistor 43. The net effect is to raise or lower the DC potential of both vanes 22 and 23 equally with respect to test body 11 thereby generating an electrostatic torque to return test body 11 to its null position.

Adjustment of the position of the slider of potentiometer 44 permits adjustment of the null point of test body 11. In addition, is should be noted that amplifiers 34 and 41 must be powered by an isolated DC power supply, not shown, in order to permit feedback of the nature shown. It should also be noted that suspension 16 could have the feedback voltage applied directly to it by utilizing a coupling capacitor between suspension 16 and the input of amplifier 34 to block the DC component from amplifier 34.

Figure 3:
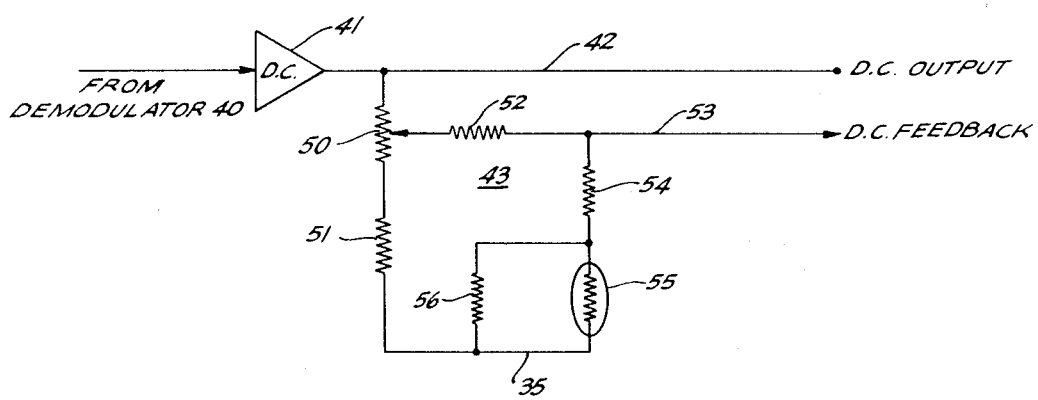
FIGS. 3–5 are circuit diagrams showing how temperature compensation may be added to the embodiment of FIG. 2.

Referring now to FIG. 3, there is shown a third embodiment of the present invention in which load resistor 43 is broken into a number of components in order to obtain thermal compensation of paramagnetic oxygen sensor 10'. More specifically, output resistor 43 now includes a potentiometer 50 connected in series with a resistor 51 between output line 42 and common line 35. The slider of potentiometer 50 is connected via a resistor 52 to a line 53 which provides the DC feedback signal to the slider of potentiometer 44 in FIG. 2. In addition, line 53 is connected via a resistor 54 to one terminal of a thermally sensitive resistor 55, the other terminal of which is connected to common line 35. Finally, a resistor 56 is connected in parallel with thermistor 55.

In operation, and utilizing the fact that at one partial pressure of oxygen suspension 16 has no thermal coefficient [see equation (3)], the output of amplifier 41 is made zero at this partial pressure of oxygen. It is then only theoretically necessary to vary the feedback fraction in the proper manner with temperature to compensate the output of the system for variations in sensor temperature. This is achieved with the circuit of FIG. 3. In addition, it is preferable to select a suspension test body which has an equivalent susceptibility equal to the full scale oxygen range. The thermally stable point then corresponds to midscale oxygen. The output of DC amplifier 41, is this case, varies from a negative valve to an equal positive value as the oxygen partial pressure varies from the minimum to the maximum value. Since zero output occurs at the point having no thermal dependence, it is sufficient that the gain be varied correctly to completely compensate the output for thermal variations of the sensor. However, it should be noted that while it may be preferred that the suspension have a magnetic susceptibility equal to that of full scale oxygen in order to make the output of amplifier 41 symmetrical, the only necessary requirement is that the output of amplifier 41 be zero at the oxygen partial pressure for which there is no thermal coefficient. Compensation by varying only amplifier gain is then possible.

Figure 4:
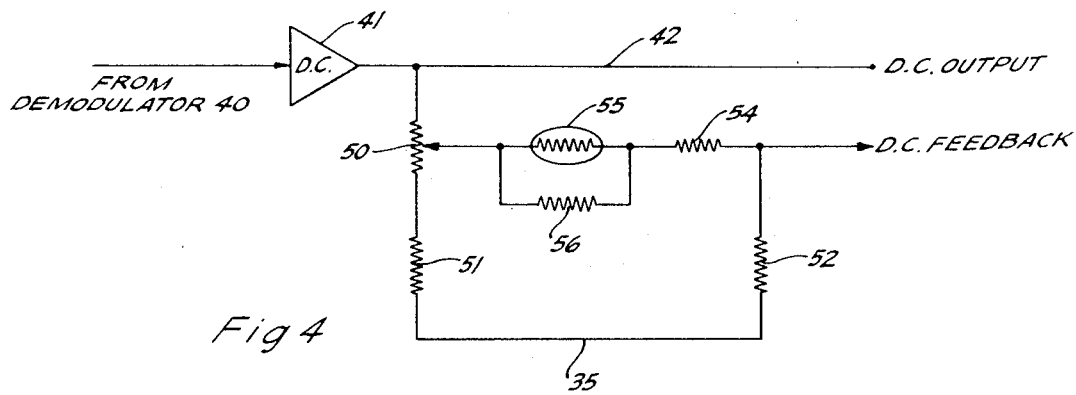

In the circuit of FIG. 3, potentiometer 50 may be used to vary the feedback fraction in order to calibrate the instrument. Furthermore, thermally sensitive resistor 55 may be utilized to vary the feedback fraction in order to vary the gain of the amplifier system to compensate for variations in sensitivity with temperature exhibited by the oxygen sensor suspension. As illustrated in FIG. 3, thermally sensitive resistor 55 would have a negative temperature coefficient which would have the effect of increasing the feedback of amplifier 41 with decreasing temperature, which is the normal requirement for compensation of the sensor. If a component having a positive temperature coefficient is preferred, the circuit shown in FIG. 4 may be utilized in which the leg containing resistor 52 and the leg containing resistors 54, 55 and 56 are reversed. In either case, the values of resistors 54, 56 and 52 are properly proportioned to provide the correct temperature coefficient. More specifically, resistors 54 and 56 are utilized to tailor the net temperature coefficient of the network to provide the desired coefficient. Resistor 51 is optional and simply a convenient means of preventing loss of feedback when the slider of potentiometer 50 is moved to the lower end thereof. This is a conventional means of assuring circuit stability.

Figure 5:
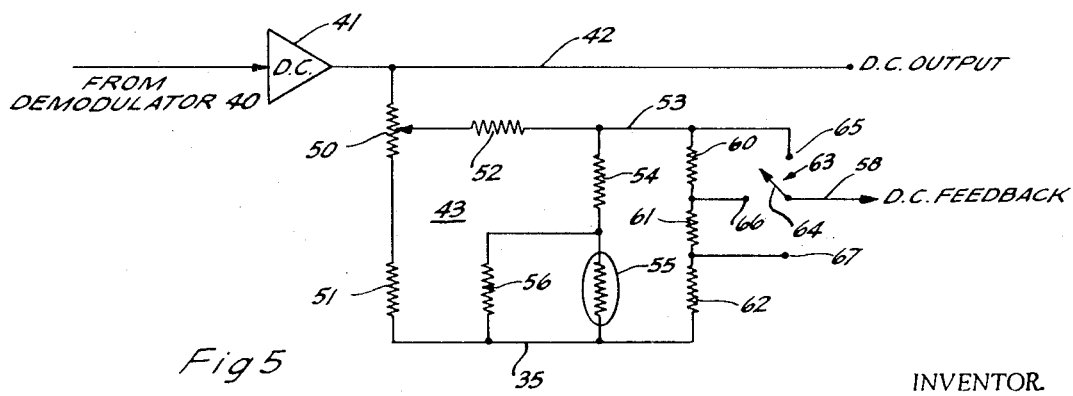

FIG. 5 illustrates a further refinement of the circuit shown in FIG. 3 to provide three ranges of oxygen partial pressure. FIG. 5 is, in all respects, identical to FIG. 3 with the addition of a network comprising series connected resistors 60, 61 and 62 connected between output line 53 and common line 35. The circuit of FIG. 5 also includes a switch 63, comprising an arm 64 and terminals 65, 66 and 67, with arm 64 providing the DC feedback signal on a line 58, with terminal 65 being connected to line 53, with terminal 66 being connected to the junction between resistors 60 and 61 and with terminal 67 being connected to the junction between resistors 61 and 62. In this manner, the voltage divider network composed of resistors 60, 61 and 62 permits stepwise variation of the feedback signal as will be required to provide three zero-based ranges. Switch 64 is, therefore, a range switch providing selectively attenuated feedback voltages. It will also be apparent to anyone skilled in the art that suppressed range operation is also permissible, requiring merely a reference voltage or reference current to provide the range suppression.

Figure 6:
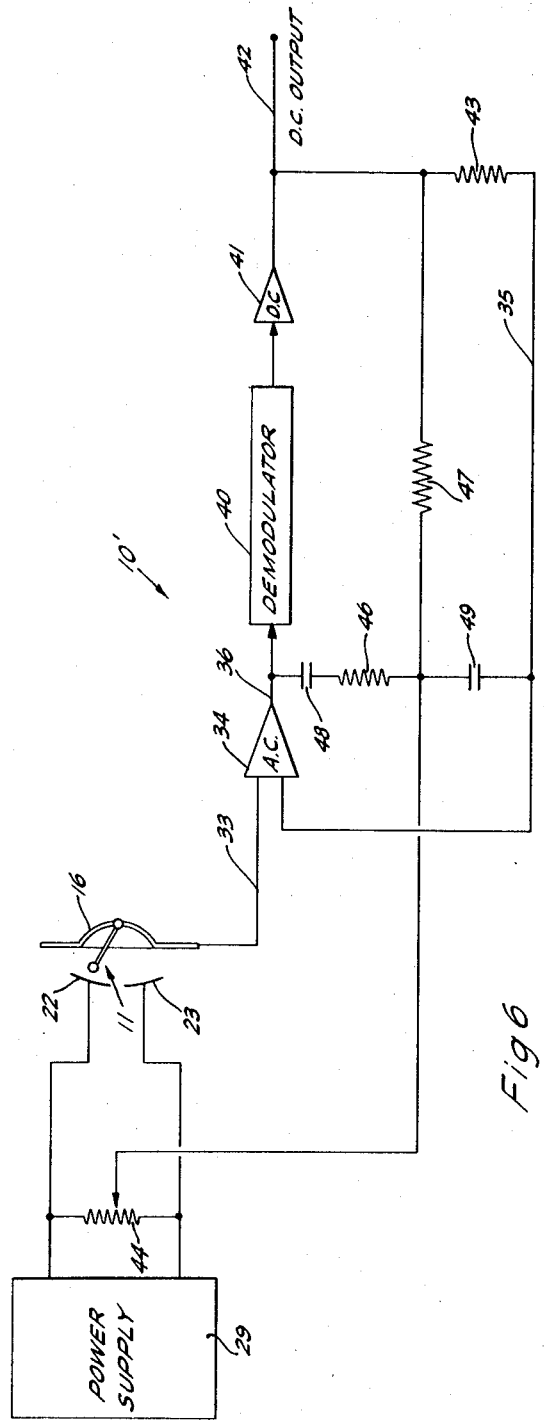
FIG. 6 is a circuit diagram illustrating an improvement over the circuit of FIG. 2.

Referring now to FIG. 6, there is shown an improvement which is applicable to all of the embodiments illustrated in FIGS. 2–5. Such improvement consists of adding an additional feedback loop between the output of AC amplifier 34 and potentiometer 44 to oppose rapid transient swings of test body 11. More specifically, the embodiment of FIG. 6 differs from that of FIG. 2 by the addition of a resistor 47 between DC output line 42 and the slider of potentiometer 44, by the addition of a resistor 46 and a capacitor 48 in series between line 36 and the slider of potentiometer 44, and the addition of a capacitor 49 between the slider of potentiometer 44 and common line 35.

In operation, the addition of circuit components 46–49 results in an additional feedback loop between the output of AC amplifier 34 and potentiometer 44 which serves to rapidly damp and reduce the amplitude of large transient displacements of test body 11. Such transients may be initiated by mechanical disturbances such as vibration, acceleration or shock. The circuit of FIG. 6 takes advantage of the fact that such large transient displacements result in corresponding outputs of AC amplifier 34 provided that it has an adequate band-pass. Typically, the output of AC amplifier 34 at the frequency applied to vanes 22 and 23 will be amplitude modulated by the resonant frequency of test body 11 for small amplitudes of oscillation. For larger amplitudes of oscillation, the output of AC amplifier 34 tends to block, destroying the gain thereof for the AC voltage applied to vanes 22 and 23. As a result, the output of demodulator 40 tends to drop to zero when the displacement of test body 11 is larger than that normally encountered, making feedback from the DC output on line 42 relatively ineffective in opposing such larger transients. On the other hand, components 46–49 cooperate to apply the transient outputs of AC amplifier 34 as a feedback voltage to potentiometer 44 to oppose the transient disturbances of test body 11.

Other known circuit techniques can be employed to accomplish the ends of the circuit shown in FIG. 6. Typically, the resonant frequency of test body 11 will be between 0.5 and 5 Hz. for practical quartz fiber suspensions. As an example, it is possible to utilize band-pass filters which provide both high gain and feedback for the suspension resonant frequency to oppose such resonance, while filtering such transient errors out of the final DC output. Such circuit techniques are well understood by those skilled in the art.

Therefore, it can be seen, that in accordance with the present invention, there is provided a paramagnetic oxygen sensor which overcomes substantially all of the problems inherent in prior art oxygen sensors of the type disclosed in US Pat. No. 2,416,344. The present sensor eliminates the mechanically sensitive systems in which a spot of light is reflected from a mirror secured to the suspension fiber. On the other hand, the present invention uses the principle of AC position sensing to provide an electrical output. However, the present AC position sensing technique eliminates the problems associated with tuned circuits to provide a highly stable output which is theoretically comparable to that of the D'Arsonval meter movement. According to a preferred embodiment of the present invention, this AC position sensing is combined with DC null balancing to eliminate problems of nonlinearity for large angles of rotation of the test body. Finally, the present invention provides a technique for temperature compensation which is substantially less expensive and more flexible than the elaborate temperature control techniques used with existing instruments.

While the invention has been described with respect to the preferred physical embodiments constructed in accordance therewith, it will be apparent to those skilled in the art that various modifications and improvements may be made without departing from the scope and spirit of the invention. More specifically, it should be noted that the present invention is not limited to paramagnetic oxygen sensors but may be used with other null type gas sensors. For example, the invention may be used as a gas density analyzer. The manner in which the present paramagnetic oxygen sensor may be converted to a density sensor is described more fully in the before-mentioned U.S. Pat. No. 3,026,472. Similarly, is should be noted that magnetic null balancing can be utilized with AC position sensing in lieu of electrostatic null balancing.

I claim:

1. In an instrument for measuring the quantity of a particular gas present in a gas mixture wherein a pivotally mounted test body is deflected from a null position when the particular gas is present, apparatus for sensing the quantity of the particular gas present comprising:
   bridge circuit means, said means comprising:
      first and second electrostatic vanes positioned in close proximity to said test body, said body and said vanes comprising capacitive elements of said bridge circuit means whereby deflection of said test body unbalances said bridge circuit;
   means cooperating with said bridge circuit means and responsive to deflection of said test body from said null position for deriving an alternating electrical signal indicative of the quantity of said particular gas surrounding said test body; and
   feedback means for applying said alternating signal to said bridge circuit means to oppose relatively large displacements of said test body.

2. In an instrument according to claim 1, apparatus further comprising:
   means for demodulating said alternating signal to provide a DC signal indicative of the quantity of said particular gas; and
   feedback means for applying said DC signal to said bridge circuit means to return said test body to said null position.

3. In an instrument according to claim 2, apparatus wherein said bridge circuit means further comprises:
   AC and DC power supply means having first and second output terminals connected to said first and second vanes, respectively; and
   first and second impedance elements connected in series between said first and second output terminals of said power supply means, said first and second impedance elements comprising elements of said bridge circuit means.

4. In an instrument according to claim 3, apparatus wherein said DC signal is applied to the junction between said first and second impedance elements.

5. In an instrument according to claim 3, apparatus wherein said DC signal is applied to said test body.

6. In an instrument according to claim 2, wherein said feedback means is operative to apply a fraction of said DC signal to said bridge circuit means, apparatus further comprising:
   means for varying the fraction of said DC signal applied to said bridge circuit means with changes in temperature of said test body and said mixture of gases; and
   means for adjusting said DC signal to zero at the quantity of said particular gas where said instrument has no temperature dependence.

7. In an instrumemt according to claim 6, wherein the magnetic susceptibility of said test body is equal to the equivalent magnetic susceptibility of said particular gas at its full scale value.

8. In an instrument according to claim 6, apparatus wherein said means for varying the fraction of said DC signal applied to said bridge circuit means comprises:
   thermally sensitive means having a negative temperature coefficient shunting said DC signal.

9. In an instrument according to claim 6, apparatus wherein said means for varying the fraction of said DC signal applied to said bridge circuit means comprises:
   thermally sensitive means having a positive temperature coefficient in series with said DC signal.

10. Apparatus for determining the partial pressure of a paramagnetic gas in a gas mixture wherein a pivotally mounted test body is supported in an inhomogeneous magnetic field, said test body being deflected from a null position when said paramagnetic gas is present and being restored to the null position by an electrostatic force, the magnitude of the restoring force being a function of the partial pressure of the paramagnetic gas, comprising:
   bridge circuit means, said test body comprising a capacitive element of said bridge circuit means, said bridge circuit means being operative, in response to deflection of said test body from said null position to generate an AC signal indicative of the partial pressure of said paramagnetic gas;
   means for demodulating said AC signal to provide a DC signal indicative of the partial pressure of said paramagnetic gas;
   feedback means for applying said DC signal to said bridge circuit means to return said test body to said null position; and
   feedback means for applying said AC signal to said bridge circuit means to oppose relatively large displacements of said test body.

11. Apparatus according to claim 10, wherein said feedback means is operative to apply a fraction of said DC signal to said bridge circuit means, and wherein said feedback means comprises:
   means for varying the fraction of said DC signal applied to said bridge circuit means with changes in temperature of said test body and said gas mixture; and
   means for adjusting said DC signal to zero at the partial pressure of said paramagnetic gas where the deflection of said test body is independent of the temperature of said test body and said gas mixture.

12. Apparatus according to claim 11, wherein said means for varying the fraction of said DC signal applied to said bridge circuit means comprises:
   temperature sensitive resistive means having a negative temperature coefficient shunting said DC signal.

13. Apparatus according to claim 11, wherein said means for varying the fraction of said DC signal applied to said bridge circuit means comprises:
   temperature sensitive resistive means having a positive temperature coefficient in series with said DC signal.